US010256884B2

(12) United States Patent
Li et al.

(10) Patent No.: US 10,256,884 B2
(45) Date of Patent: Apr. 9, 2019

(54) METHOD AND APPARATUS FOR QUANTIZING CHANNEL STATE INFORMATION

(71) Applicant: Alcatel Lucent, Boulogne Billancourt (FR)

(72) Inventors: Xun Li, Shanghai (CN); Qinglin Luo, Shanghai (CN); Tao Yang, Shanghai (CN)

(73) Assignee: Alcatel Lucent, Nozay (FR)

( * ) Notice: Subject to any disclaimer, the term of this patent is extended or adjusted under 35 U.S.C. 154(b) by 77 days.

(21) Appl. No.: 15/123,727

(22) PCT Filed: Mar. 6, 2014

(86) PCT No.: PCT/CN2014/000205
§ 371 (c)(1),
(2) Date: Sep. 6, 2016

(87) PCT Pub. No.: WO2015/131300
PCT Pub. Date: Sep. 11, 2015

(65) Prior Publication Data
US 2017/0012689 A1 Jan. 12, 2017

(51) Int. Cl.
*H04B 7/06* (2006.01)
*H04B 7/04* (2017.01)
(Continued)

(52) U.S. Cl.
CPC ......... *H04B 7/0626* (2013.01); *H04B 7/0456* (2013.01); *H04B 7/0478* (2013.01);
(Continued)

(58) Field of Classification Search
None
See application file for complete search history.

(56) References Cited

U.S. PATENT DOCUMENTS

2013/0114763 A1* 5/2013 Park ............... H04B 7/0413
375/296
2013/0162476 A1* 6/2013 Thomas ............ H01Q 3/30
342/372

(Continued)

FOREIGN PATENT DOCUMENTS

CN 103039018 A 4/2013
CN 103209012 A 7/2013
(Continued)

OTHER PUBLICATIONS

Alcatel-Lucent et al., "Considerations on CSI feedback enhancements for high priority antenna configurations," 3$^{rd}$ Generation Partnership Project (3GPP), 3GPP TSG-RAN WG1 #66, R1-112420, 7 pages, Athens, Greece, Aug. 22-26, 2011.
(Continued)

*Primary Examiner* — George C Atkins
(74) *Attorney, Agent, or Firm* — Fay Sharpe LLP

(57) ABSTRACT

The present invention relates to a method and an apparatus for quantizing channel state information (CSI). According to an embodiment of the present invention, a method for quantizing CSI is provided, which can be implemented on a base station side. The method includes: broadcasting antenna configuration of a base station to a user equipment, wherein the antenna configuration includes an antenna port in a vertical direction and an antenna port in a horizontal direction; sending a reference signal (RS) to the user equipment; receiving a vertical precoder corresponding to the antenna port in a vertical direction and a horizontal precoder corresponding to the antenna port in a horizontal direction that are fed back by the user equipment; and based on the received vertical precoder and horizontal precoder, reconstructing a precoder by using a vertical codebook corresponding to the antenna port in a vertical direction and a
(Continued)

horizontal codebook corresponding to the antenna port in a horizontal direction.

15 Claims, 2 Drawing Sheets

(51) Int. Cl.
  H04W 72/04  (2009.01)
  H04L 1/00   (2006.01)
  H04L 1/20   (2006.01)
  H04B 7/0456  (2017.01)
  H04W 84/04  (2009.01)

(52) U.S. Cl.
  CPC ......... *H04B 7/0617* (2013.01); *H04L 1/0026* (2013.01); *H04L 1/20* (2013.01); *H04W 72/042* (2013.01); *H04W 72/0413* (2013.01); *H04W 84/042* (2013.01)

(56) References Cited

U.S. PATENT DOCUMENTS

| | | | |
|---|---|---|---|
| 2013/0259151 A1 | 10/2013 | Thomas et al. | |
| 2013/0308715 A1 | 11/2013 | Nam et al. | |
| 2013/0329664 A1 | 12/2013 | Kim et al. | |
| 2014/0016549 A1* | 1/2014 | Novlan | H04B 7/0417 370/328 |
| 2014/0098689 A1* | 4/2014 | Lee | H04B 7/0469 370/252 |
| 2014/0169415 A1* | 6/2014 | Werner | H04B 7/0456 375/219 |
| 2014/0177745 A1* | 6/2014 | Krishnamurthy | H04B 7/0413 375/267 |
| 2014/0301492 A1* | 10/2014 | Xin | H04B 7/0456 375/267 |

FOREIGN PATENT DOCUMENTS

| | | |
|---|---|---|
| CN | 103518415 A | 1/2014 |
| EP | 2 665 203 A1 | 11/2013 |
| WO | WO 2010/064842 A2 | 6/2010 |
| WO | WO 2013/172692 A1 | 11/2013 |

OTHER PUBLICATIONS

International Search Report for PCT/CN2014/000205 dated Dec. 15, 2014.

* cited by examiner

METHOD AND APPARATUS FOR QUANTIZING CHANNEL STATE INFORMATION

BACKGROUND OF THE INVENTION

Field of the Invention

The present invention relates to a method and an apparatus for wireless communication, and more specifically, to a method and an apparatus for quantizing channel state information (CSI) in a wireless communications system.

Description of the Prior Art

In view of requirements for further perfection and performance improvement of a Long Term Evolution/Long Term Evolution Advanced (LTE/LTE-A) system, the industry hopes to increase control on an antenna port in a vertical direction, so as to implement system policies of more types, for example, user equipment dedicated vertical beamforming.

In the current LTE/LTE-A system, a method for quantizing CSI by using horizontal beamforming has been widely used. Specifically, a linear antenna array is assembled on a base station, and the linear antenna array can determine horizontal attribution of energy from a user equipment and form a horizontal beam directed to a direction. However, for energy control in a vertical direction, physically tilting down the antenna array for a small angle can only be implemented currently, so as to concentrate energy more on a serving cell and reduce interference on a neighboring cell. The downtilt angle is adjusted by a higher layer of a base station in a cell in a half-static manner, so as to adjust to an entire coverage requirement change.

Therefore, the foregoing horizontal beamforming and cell dedicated downtilt improvement cannot perform dynamic control in a vertical direction in a user dedicated manner.

SUMMARY OF THE INVENTION

One of objectives of the present invention lies in providing an effective technical solution for quantizing CSI of an antenna array, so as to further improve performance of an LTE/LTE-A system.

An embodiment of the present invention provides a method for quantizing CSI, which can be implemented on a base station side. The method includes: broadcasting antenna configuration of a base station to a user equipment, wherein the antenna configuration includes an antenna port in a vertical direction and an antenna port in a horizontal direction; sending a reference signal (RS) to the user equipment; receiving a vertical precoder corresponding to the antenna port in a vertical direction and a horizontal precoder corresponding to the antenna port in a horizontal direction that are fed back by the user equipment; and based on the received vertical precoder and horizontal precoder, reconstructing a precoder by using a vertical codebook corresponding to the antenna port in a vertical direction and a horizontal codebook corresponding to the antenna port in a horizontal direction.

Another embodiment of the present invention provides a method for quantizing CSI, which can be implemented on a base station side. The method includes: receiving antenna configuration of a base station, wherein the antenna configuration includes an antenna port in a vertical direction and an antenna port in a horizontal direction; selecting a vertical codebook that is applied to the antenna port in a vertical direction and a horizontal codebook that is applied to the antenna port in a horizontal direction; constructing a combined codebook for the antenna configuration by using the selected vertical codebook and horizontal codebook; receiving an RS, and estimating CSI based on the received RS; selecting a precoder from the combined codebook based on the estimated CSI; and based on the selected precoder, feeding back a vertical precoder corresponding to the antenna port in a vertical direction and a horizontal precoder corresponding to the antenna port in a horizontal direction.

In an embodiment of the present invention, reconstructing a precoder includes combining the vertical codebook with the horizontal codebook by using a Kronecker product function. The vertical codebook and the horizontal codebook are codebooks with a corresponding quantity, which is specified by standards 36.211 and 36.213, of antenna ports. The antenna configuration includes 8, 16, 32, or 64 antenna ports. Reconstructing a combined codebook includes combining the vertical codebook with the horizontal codebook by using a Kronecker product function. Selecting a precoder is based on a maximum capacity principle or a maximum signal-to-noise ratio principle.

An embodiment of the present invention further provides a base station, which includes: a broadcaster, a transmitter, a receiver, and a reconstructor. The broadcaster broadcasts antenna configuration of the base station to a user equipment, wherein the antenna configuration includes an antenna port in a vertical direction and an antenna port in a horizontal direction. The transmitter sends an RS to the user equipment. The receiver receives a vertical precoder corresponding to the antenna port in a vertical direction and a horizontal precoder corresponding to the antenna port in a horizontal direction that are fed back by the user equipment. The reconstructor reconstructs, based on the received vertical precoder and horizontal precoder, a precoder by using a vertical codebook corresponding to the antenna port in a vertical direction and a horizontal codebook corresponding to the antenna port in a horizontal direction.

Moreover, another embodiment of the present invention provides a user equipment, which includes: a receiver, a codebook selector, a constructor, an estimator, a precoder selector, and a feedback device. The receiver receives antenna configuration of a base station, wherein the antenna configuration includes an antenna port in a vertical direction and an antenna port in a horizontal direction. The codebook selector selects a vertical codebook that is applied to the antenna port in a vertical direction and a horizontal codebook that is applied to the antenna port in a horizontal direction. The constructor constructs a combined codebook for the antenna configuration by using the selected vertical codebook and horizontal codebook. The estimator receives an RS, and estimates CSI based on the received RS. The precoder selector selects a precoder from the combined codebook based on the estimated CSI. The feedback device feeds back, based on the selected precoder, a vertical precoder corresponding to the antenna port in a vertical direction and a horizontal precoder corresponding to the antenna port in a horizontal direction.

The present invention implements performance of a two-dimensional antenna array by using a horizontal codebook based on complete compatibility with existing LTE/LTE-A standards. Moreover, overheads needed for feeding back a precoder are small, and effects on system throughputs are low.

DETAILED DESCRIPTION

To understand the spirit of the present invention better, the following further describes the present invention with reference to some preferable embodiments of the present invention.

One of methods for implementing user equipment dedicated vertical beamforming is to periodically send cell dedicated channel state information-reference signals (CSI-RSs) on all antenna ports, and use CSI reports, which correspond to the CSI-RSs, of a user equipment to implement beamforming in a vertical direction.

However, in a frequency division duplexing (FDD) system, because frequencies between uplinks are independent from frequencies between downlinks, a user equipment has to feed back a precoder, which is indicated by a precoding matrix (PMI), to a base station. However, a codebook in an existing LTE/LTE-A version is optimized only directed to an antenna applied in a horizontal direction, and channel performance of a vertical field is completely different from that of a horizontal field.

The present invention makes full use of the existing codebook to minimize effects on existing standards. During complete compatibility with the existing LTE/LTE-A system, a method and an apparatus for quantizing CSI provided by the present invention effectively use a linear antenna array to implement a codebook having attributes in both vertical and horizontal directions, so as to further improve performance of the LTE/LTE-A system.

Figure 1:
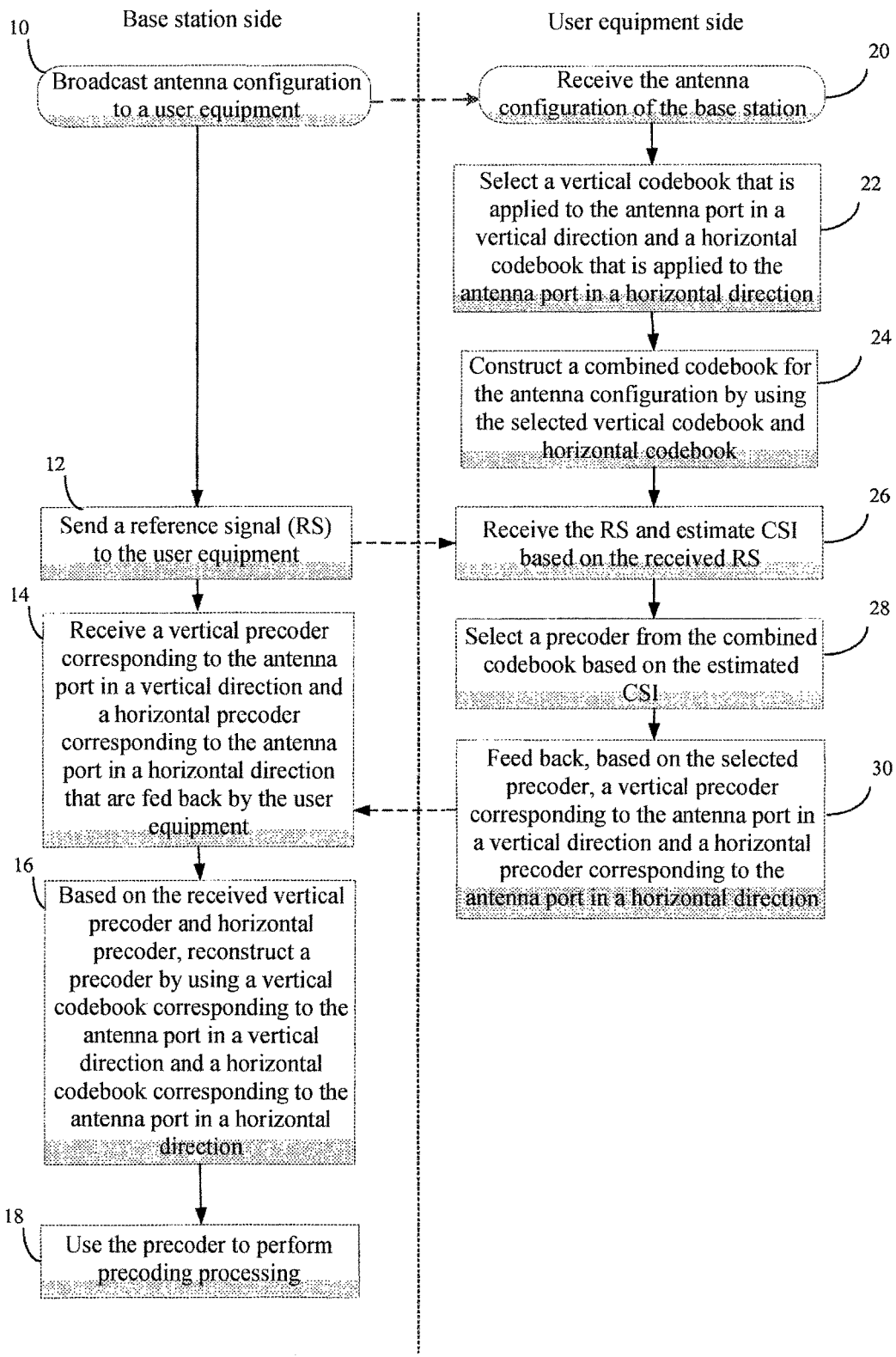
FIG. 1 is a flowchart of a method for quantizing CSI according to an embodiment of the present invention.

FIG. 1 is a flowchart of a method for quantizing CSI according to an embodiment of the present invention. The flowchart is a system-level demo, and includes operations respectively executed on a base station side and a user equipment side.

As shown in FIG. 1, on the base station side, at step 10, a base station 40 broadcasts antenna configuration thereof to a user equipment 50, wherein the antenna configuration includes an antenna port in a vertical direction and an antenna port in a horizontal direction. The step 10 can be selected to be performed during system initiation.

Correspondingly, on the user equipment side, at step 20, the user equipment 50 receives the antenna configuration sent by the base station 40. Based on the received antenna configuration, the user equipment 50 selects, in step 22, a vertical codebook that is applied to the antenna port in a vertical direction in the antenna configuration and a horizontal codebook that is applied to the antenna port in a horizontal direction in the antenna configuration, and constructs, in step 24, a combined codebook for the antenna configuration by using the selected vertical codebook and horizontal codebook.

On the base station side, at step 12, the base station 40 sends an RS to the user equipment 50.

Correspondingly, on the user equipment side, at step 26, the RS is received, and CSI is estimated based on the received RS. At step 28, the user equipment 50 selects a precoder from the combined codebook based on the estimated CSI, and the precoder may be indicated by a PMI. At step 30, the user equipment 50 feeds back, based on the selected precoder, a vertical precoder corresponding to the antenna port in a vertical direction and a horizontal precoder corresponding to the antenna port in a horizontal direction to the base station 40.

On the base station side, at step 14, the base station 40 receives a vertical precoder corresponding to the antenna port in a vertical direction and a horizontal precoder corresponding to the antenna port in a horizontal direction that are fed back by the user equipment 50. Then, at step 16, based on the received vertical precoder and horizontal precoder, the base station 40 reconstructs a precoder by using a vertical codebook corresponding to the antenna port in a vertical direction and a horizontal codebook corresponding to the antenna port in a horizontal direction. In this way, at step 18, the base station 40 can use the precoder to perform precoding processing, so as to implement quantization on the CSI.

The sequence of the steps of the foregoing flowchart is used only for clear description, and is not a necessary limitation to a sequence of execution. For example, as well known to a person skilled in the art, the RS may be included in information to be sent by the base station 40 to the user equipment 50, and may be sent together with the information, and does not need to be sent specifically; and therefore the RS is not necessarily sent and received only after the user equipment 50 completes the combined codebook construction.

By using 8 antenna ports as an example, the base station 40 can configure $M_v(M_v=\{1, 2, 4, 8\})$ vertical antenna ports and $M_h(M_h=\{1, 2, 4, 8\})$ horizontal antenna ports. The horizontal precoding processing is indicated as $$y = HWs + n \quad (1)$$

wherein s indicates message transmission; H indicates channel implementation between a transmitter and a receiver; n indicates additive white Gaussian noise (AWGN); and W indicates a combined precoder. W can be obtained from the following formula $$W = \mathrm{kron}\{W_v, W_h\} \quad (2)$$

wherein $\mathrm{kron}\{\cdot\}$ indicates a Kronecker product function; $W_v$ and $W_h$ respectively indicate a precoder for vertical antenna ports and a precoder for horizontal antenna ports. $W_v$ is selected from a vertical codebook relevant to a quantity of vertical antenna ports, and $W_h$ is selected from a horizontal codebook relevant to a quantity of horizontal antenna ports; the vertical codebook and the horizontal codebook are both specified in standards 36.211 and 36.213 in an existing 3rd Generation Partnership Project (3GPP). For different quantities of vertical antenna ports and horizontal antenna ports, codebook selections are listed in table 1 one by one, wherein $W^n$ indicates a codebook specified in standards 36.211 and 36.213.

TABLE 1

| 8 antenna ports | | |
|---|---|---|
| Quantity of vertical antenna ports | Quantity of horizontal antenna ports | Combined precoder $W = \mathrm{kron}\{W_v, W_h\}$ |
| 1 | 8 | $W_v = 1; W_h \in W^8$ |
| 2 | 4 | $W_v \in W^2; W_h \in W^4$ |
| 4 | 2 | $W_v \in W^4; W_h \in W^2$ |
| 8 | 1 | $W_v \in W^8; W_h = 1$ |

Similarly, the present invention can be extended to other quantities of antenna ports, for example, 16, 32, 64, etc. Tables 2, 3, and 4 respectively list combined precoders for quantities of antenna ports: 16, 32, and 64, wherein $W^n$ indicates a codebook specified in standards 36.211 and 36.213. A person skilled in the art can perform more analogical extensions based on the content.

TABLE 2

| | 16 antenna ports | |
|---|---|---|
| Quantity of vertical antenna ports | Quantity of horizontal antenna ports | Combined precoder $W = \text{kron}\{W_v, W_h\}$ |
| 2 | 8 | $W_v \in W^2; W_h \in W^8$ |
| 4 | 4 | $W_v \in W^4; W_h \in W^4$ |
| 8 | 2 | $W_v \in W^8; W_h \in W^2$ |

TABLE 3

| | 32 antenna ports | |
|---|---|---|
| Quantity of vertical antenna ports | Quantity of horizontal antenna ports | Combined precoder $W = \text{kron}\{W_v, W_h\}$ |
| 4 | 8 | $W_v \in W^4; W_h \in W^8$ |
| 8 | 4 | $W_v \in W^8; W_h \in W^4$ |

TABLE 4

| | 64 antenna ports | |
|---|---|---|
| Quantity of vertical antenna ports | Quantity of horizontal antenna ports | Combined precoder $W = \text{kron}\{W_v, W_h\}$ |
| 8 | 8 | $W_v \in W^8; W_h \in W^8$ |

On the user equipment side, the user equipment 50 needs to feed back a vertical precoder $PMI_v$ and a horizontal precoder $PMI_h$ respectively selected in the vertical codebook and the horizontal codebook. Then a codeword selected from the combined codebook by the user equipment 50 is indicated as:

$$W(PMI_v, PMI_h) = \text{kron}\{W_v(PMI_v), W_h(PMI_h)\} \quad (3)$$

The combined codeword is a two-dimensional codeword including a vertical direction and a horizontal direction.

The user equipment 50 can follow a certain rule when selecting a codeword, for example, a maximum capacity principle or a maximum signal-to-noise ratio, which can be specifically indicated as:

$$(PMI_v, PMI_h) = \underset{x \leq size\{CB_v\}; y \leq size\{CB_h\}}{\arg\max} \{HW(x, y)\} \quad (4)$$

$$= \underset{x \leq size\{CB_v\}; y \leq size\{CB_h\}}{\arg\max} \{H \cdot \text{kron}\{W_v(x), W_h(y)\}\}$$

The size $\{CB\}$ function returns a size of a corresponding codebook; the codebook is obtained as listed in the foregoing tables.

The user equipment 50 feeds back the selected precoder to the base station 40. Then the base station 40 respectively selects a vertical precoder and a horizontal precoder from the corresponding vertical codebook and horizontal codebook, and then follows a certain rule, for example, a Kronecker product function, to calculate a combined precoder for precoding processing.

Suppose specific configuration of the 8 antenna ports is 2 vertical antenna ports and 4 horizontal antenna ports, then a Codebook$_{vertical}$ with a rank 1 can be indicated as following $$\text{Codebook}_{vertical} = \left\{ \left\{ \frac{1}{\sqrt{2}}\begin{bmatrix}1\\1\end{bmatrix}\right\}, \left\{\frac{1}{\sqrt{2}}\begin{bmatrix}1\\-1\end{bmatrix}\right\}, \left\{\frac{1}{\sqrt{2}}\begin{bmatrix}1\\j\end{bmatrix}\right\}, \right.$$

$$\left. \left\{\frac{1}{\sqrt{2}}\begin{bmatrix}1\\-j\end{bmatrix}\right\}\right\}$$

A Codebook$_{horizontal}$ with a rank 1 can be indicated as following $$\text{Codebook}_{horizontal} =$$

$$PMI_{1-4}: \left\{ \frac{1}{2}\begin{bmatrix}1\\-1\\-1\\-1\end{bmatrix}, \frac{1}{2}\begin{bmatrix}1\\-j\\1\\j\end{bmatrix}, \frac{1}{2}\begin{bmatrix}1\\1\\-1\\1\end{bmatrix}, \frac{1}{2}\begin{bmatrix}1\\j\\-1\\-j\end{bmatrix} \right\}$$

$$PMI_{5-8}: \left\{ \frac{1}{2}\begin{bmatrix}1\\\frac{-1-j}{\sqrt{2}}\\-j\\\frac{1-j}{\sqrt{2}}\end{bmatrix}, \frac{1}{2}\begin{bmatrix}1\\\frac{1-j}{\sqrt{2}}\\j\\\frac{-1-j}{\sqrt{2}}\end{bmatrix}, \frac{1}{2}\begin{bmatrix}1\\\frac{1+j}{\sqrt{2}}\\-j\\\frac{-1+j}{\sqrt{2}}\end{bmatrix}, \frac{1}{2}\begin{bmatrix}1\\\frac{-1+j}{\sqrt{2}}\\j\\\frac{1+j}{\sqrt{2}}\end{bmatrix} \right\}$$

$$PMI_{9-12}: \left\{ \frac{1}{2}\begin{bmatrix}1\\-1\\1\\1\end{bmatrix}, \frac{1}{2}\begin{bmatrix}1\\-j\\-1\\-j\end{bmatrix}, \frac{1}{2}\begin{bmatrix}1\\1\\1\\-1\end{bmatrix}, \frac{1}{2}\begin{bmatrix}1\\j\\-1\\j\end{bmatrix} \right\}$$

$$PMI_{13-16}: \left\{ \frac{1}{2}\begin{bmatrix}1\\-1\\-1\\1\end{bmatrix}, \frac{1}{2}\begin{bmatrix}1\\-1\\1\\-1\end{bmatrix}, \frac{1}{2}\begin{bmatrix}1\\1\\-1\\-1\end{bmatrix}, \frac{1}{2}\begin{bmatrix}1\\1\\1\\1\end{bmatrix} \right\}$$

Then when $PMI_v=1$, a $Codebook_{combined}$ can be indicated as $$Codebook_{combined}(PMI_v = 1) =$$

$$PMI_h = 1 \sim 4: \left\{ \frac{1}{\sqrt{8}}\begin{pmatrix}1\\1\\-1\\-1\\-1\\-1\\-1\\-1\end{pmatrix}, \frac{1}{\sqrt{8}}\begin{pmatrix}1\\1\\-j\\-j\\-1\\-1\\j\\j\end{pmatrix}, \frac{1}{\sqrt{8}}\begin{pmatrix}1\\1\\1\\1\\-1\\-1\\1\\1\end{pmatrix}, \frac{1}{\sqrt{8}}\begin{pmatrix}1\\1\\j\\j\\-1\\-1\\-j\\-j\end{pmatrix} \right\}$$

$$PMI_h = 5 \sim 8: \left\{ \frac{1}{\sqrt{8}}\begin{pmatrix}1\\1\\\frac{-1-j}{\sqrt{2}}\\\frac{-1-j}{\sqrt{2}}\\-j\\-j\\\frac{1-j}{\sqrt{2}}\\\frac{1-j}{\sqrt{2}}\end{pmatrix}, \frac{1}{\sqrt{8}}\begin{pmatrix}1\\1\\\frac{1-j}{\sqrt{2}}\\\frac{1-j}{\sqrt{2}}\\j\\j\\\frac{-1-j}{\sqrt{2}}\\\frac{-1-j}{\sqrt{2}}\end{pmatrix}, \frac{1}{\sqrt{8}}\begin{pmatrix}1\\1\\\frac{1+j}{\sqrt{2}}\\\frac{1+j}{\sqrt{2}}\\-j\\-j\\\frac{-1+j}{\sqrt{2}}\\\frac{-1+j}{\sqrt{2}}\end{pmatrix}, \frac{1}{\sqrt{8}}\begin{pmatrix}1\\1\\\frac{-1+j}{\sqrt{2}}\\\frac{-1+j}{\sqrt{2}}\\j\\j\\\frac{1+j}{\sqrt{2}}\\\frac{1+j}{\sqrt{2}}\end{pmatrix} \right\}$$

$$PMI_h = 9 \sim 12: \left\{ \frac{1}{\sqrt{8}}\begin{pmatrix}1\\1\\-1\\-1\\1\\1\\1\\1\end{pmatrix}, \frac{1}{\sqrt{8}}\begin{pmatrix}1\\1\\-j\\-j\\1\\-1\\-j\\-j\end{pmatrix}, \frac{1}{\sqrt{8}}\begin{pmatrix}1\\1\\1\\1\\1\\1\\1\\1\end{pmatrix}, \frac{1}{\sqrt{8}}\begin{pmatrix}1\\1\\j\\j\\-1\\-1\\j\\j\end{pmatrix} \right\}$$

$$PMI_h = 13 \sim 16: \left\{ \frac{1}{\sqrt{8}}\begin{pmatrix}1\\1\\-1\\-1\\-1\\-1\\1\\1\end{pmatrix}, \frac{1}{\sqrt{8}}\begin{pmatrix}1\\1\\-1\\-1\\1\\1\\-1\\-1\end{pmatrix}, \frac{1}{\sqrt{8}}\begin{pmatrix}1\\1\\1\\1\\-1\\-1\\-1\\-1\end{pmatrix}, \frac{1}{\sqrt{8}}\begin{pmatrix}1\\1\\1\\1\\1\\1\\1\\1\end{pmatrix} \right\}$$

Figure 2:
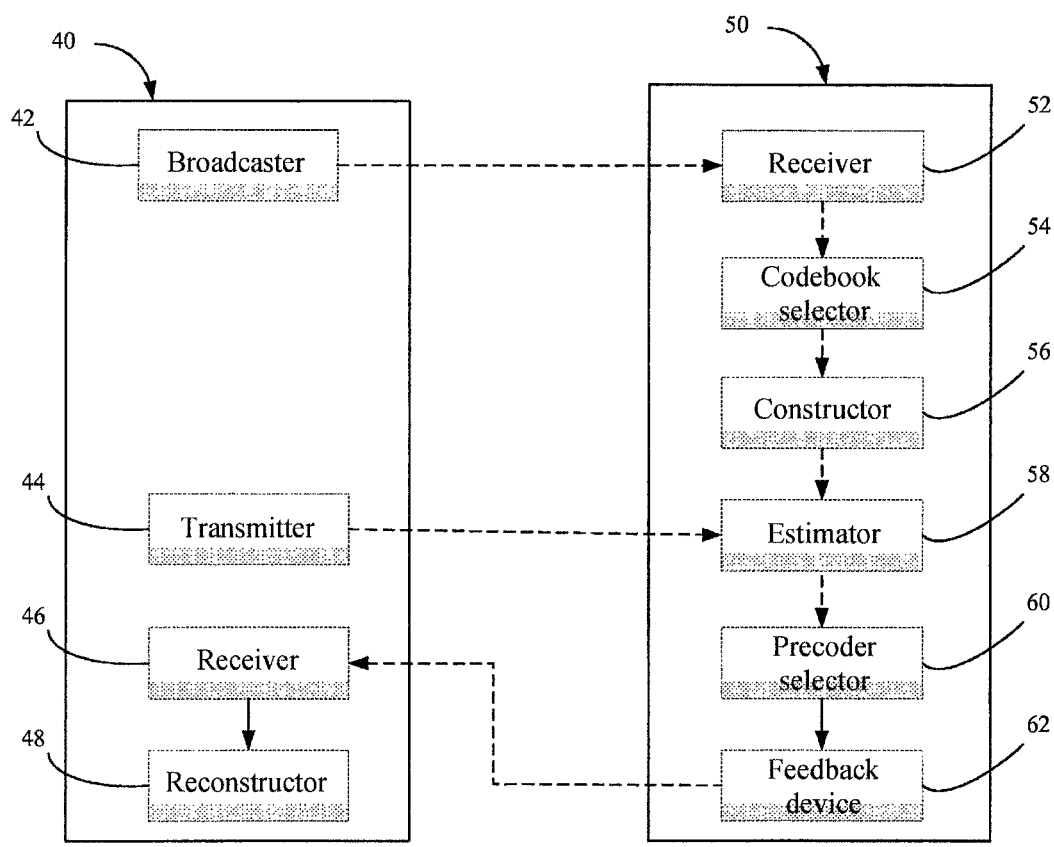
FIG. 2 is a schematic structural diagram of a system for quantizing CSI according to an embodiment of the present invention, which can implement the method in FIG. 1.

An embodiment of the present invention further provides apparatuses for quantizing CSI, for example, a base station 40 and a user equipment 50. FIG. 2 is a schematic structural diagram of a system for quantizing CSI according to an embodiment of the present invention, which can implement the method in FIG. 1.

As shown in FIG. 2, a base station 40 includes: a broadcaster 42, a transmitter 44, a receiver 46, and a reconstructor 48. The broadcaster 42 broadcasts antenna configuration of the base station 40 to a user equipment 50, wherein the antenna configuration includes an antenna port in a vertical direction and an antenna port in a horizontal direction. The transmitter 44 sends an RS to the user equipment 50. The receiver 46 receives a vertical precoder corresponding to the antenna port in a vertical direction and a horizontal precoder corresponding to the antenna port in a horizontal direction that are fed back by the user equipment 50. The reconstructor 48 reconstructs, based on the received vertical precoder and horizontal precoder, a precoder by using a vertical codebook corresponding to the antenna port in a vertical direction and a horizontal codebook corresponding to the antenna port in a horizontal direction.

The user equipment 50 then includes a receiver 52, a codebook selector 54, a constructor 56, an estimator 58, a precoder selector 60, and a feedback device 62. The receiver 52 receives the antenna configuration of the base station 40. The codebook selector 54 selects the vertical codebook that is applied to the antenna port in a vertical direction and the horizontal codebook that is applied to the antenna port in a horizontal direction. The constructor 56 constructs a combined codebook for the antenna configuration by using the selected vertical codebook and horizontal codebook. The estimator 58 receives the RS, and estimates CSI based on the received RS. The precoder selector 60 selects a precoder from the combined codebook based on the estimated CSI. The feedback device 62 feeds back, based on the selected precoder, a vertical precoder corresponding to the antenna port in a vertical direction and a horizontal precoder corresponding to the antenna port in a horizontal direction.

Upon simulation comparison, as compared with the existing codebook, the method and apparatus for quantizing CSI of the present invention can save a large quantity of feedback overheads; for example, 25% of overheads can be saved for 8 antenna ports, and more overheads can be saved for 16, 32, or more antenna ports.

It should be noted that because of technology development and standard updates, there are generally multiple different names for components having a same function. Technical terms used in the patent application of the present invention are used to explain and demonstrate technical solutions of the present invention, and functions, which are commonly known in the art, of the technical terms should be used as criteria, and the technical terms cannot be arbitrarily understood only according to differences and similarities of names.

The technical content and technical characteristics of the present invention are disclosed as above. However, a person skilled in the art may still make various substitutions and modifications that do not deviate from the spirit of the present invention based on the teaching and disclosure of the present invention. Therefore, the protection scope of the present invention should not be limited to content disclosed by embodiments and should include various substitutions and modifications that do not deviate from the spirit of the present invention, and the substitutions and modifications should be covered by claims of the present patent application.

We claim:

1. A method of operating a base station, said method comprising:
   broadcasting antenna configuration of a base station to a user equipment, wherein the antenna configuration comprises an antenna port in a vertical direction and an antenna port in a horizontal direction;
   sending a reference signal (RS) to the user equipment;
   receiving a vertical precoder corresponding to the antenna port in a vertical direction and a horizontal precoder corresponding to the antenna port in a horizontal direction that are fed back by the user equipment, wherein said vertical precoder and said horizontal precoder that are fed back by the user equipment are based upon a precoder selected from a combined codebook which combined codebook is constructed from a vertical codebook corresponding to the antenna port in the vertical direction and a horizontal codebook corresponding to the antenna port in the horizontal direction, said precoder being selected from the combined codebook based upon a channel state information (CSI) estimated from the RS; and
   based on the received vertical precoder and horizontal precoder, reconstructing a precoder by using the vertical codebook corresponding to the antenna port in the vertical direction and the horizontal codebook corresponding to the antenna port in the horizontal direction.

2. The method according to claim 1, wherein the reconstructing a precoder comprises combining the vertical codebook with the horizontal codebook by using a Kronecker product function.

3. The method according to claim 1, wherein the vertical codebook and the horizontal codebook are codebooks with a corresponding quantity, which is specified by 3rd Generation Partnership Project (3GPP) V11.5.0 or prior, standards 36.211 and 36.213, of antenna ports.

4. The method according to claim 1, wherein the antenna configuration comprises 8, 16, 32, or 64 antenna ports.

5. A method of operating a user equipment, said method comprising:
   receiving antenna configuration of a base station, wherein the antenna configuration comprises an antenna port in a vertical direction and an antenna port in a horizontal direction;
   selecting a vertical codebook that is applied to the antenna port in the vertical direction and a horizontal codebook that is applied to the antenna port in the horizontal direction;
   constructing a combined codebook for the antenna configuration by using the selected vertical codebook and horizontal codebook;
   receiving a reference signal (RS), and estimating channel state information (CSI) based on the received RS;
   selecting a precoder from the combined codebook based on the estimated CSI; and
   based on the selected precoder, feeding back a vertical precoder corresponding to the antenna port in the vertical direction and a horizontal precoder corresponding to the antenna port in the horizontal direction.

6. The method according to claim 5, wherein the reconstructing a combined codebook comprises combining the vertical codebook with the horizontal codebook by using a Kronecker product function.

7. The method according to claim 5, wherein the vertical codebook and the horizontal codebook are codebooks with a corresponding quantity, which is specified by 3rd Generation Partnership Project (3GPP) V11.5.0 or prior, standards 36.211 and 36.213, of antenna ports.

8. The method according to claim 5, wherein the selecting a precoder is based on a maximum capacity principle or a maximum signal-to-noise ratio principle.

9. The method according to claim 5, wherein the antenna configuration comprises 8, 16, 32, or 64 antenna ports.

10. A base station, comprising:
   a broadcaster, which broadcasts antenna configuration of the base station to a user equipment, wherein the antenna configuration comprises an antenna port in a vertical direction and an antenna port in a horizontal direction;
   a transmitter, which sends a reference signal (RS) to the user equipment;
   a receiver, which receives a vertical precoder corresponding to the antenna port in a vertical direction and a horizontal precoder corresponding to the antenna port in a horizontal direction that are fed back by the user equipment, wherein said vertical precoder and said horizontal precoder that are fed back by the user equipment are based upon a precoder selected from a combined codebook which combined codebook is constructed from a vertical codebook corresponding to the antenna port in the vertical direction and a horizontal codebook corresponding to the antenna port in the horizontal direction, said precoder being selected from the combined codebook based upon a channel state information (CSI) estimated from the RS; and a reconstructor, which reconstructs, based on the received vertical precoder and horizontal precoder, a precoder by using the vertical codebook corresponding to the antenna port in the vertical direction and the horizontal codebook corresponding to the antenna port in the horizontal direction.

11. The base station according to claim 10, wherein the reconstructing a precoder by the reconstructor comprises combining the vertical codebook with the horizontal codebook by using a Kronecker product function.

12. The base station according to claim 10, wherein the vertical codebook and the horizontal codebook are codebooks with a corresponding quantity, which is specified by 3rd Generation Partnership Project (3GPP) V11.5.0 or prior, standards 36.211 and 36.213, of antenna ports.

13. A user equipment, comprising:

a receiver, which receives antenna configuration of a base station, wherein the antenna configuration comprises an antenna port in a vertical direction and an antenna port in a horizontal direction;

a codebook selector, which selects a vertical codebook that is applied to the antenna port in the vertical direction and a horizontal codebook that is applied to the antenna port in the horizontal direction;

a constructor, which constructs a combined codebook for the antenna configuration by using the selected vertical codebook and horizontal codebook;

an estimator, which receives a reference signal (RS), and estimates channel state information (CSI) based on the received RS;

a precoder selector, which selects a precoder from the combined codebook based on the estimated CSI; and a feedback device, which feeds back, based on the selected precoder, a vertical precoder corresponding to the antenna port in the vertical direction and a horizontal precoder corresponding to the antenna port in the horizontal direction.

14. The user equipment according to claim 13, wherein the reconstructing a combined codebook by the constructor comprises combining the vertical codebook with the horizontal codebook by using a Kronecker product function.

15. The user equipment according to claim 13, wherein the vertical codebook and the horizontal codebook are codebooks with a corresponding quantity, which is specified by 3rd Generation Partnership Project (3GPP) V11.5.0 or prior, standards 36.211 and 36.213, of antenna ports.

* * * * *